Aug. 21, 1956 J. D. JOHANNESEN 2,760,057
SIGNAL DUPLEXING SYSTEM
Filed Jan. 10, 1946
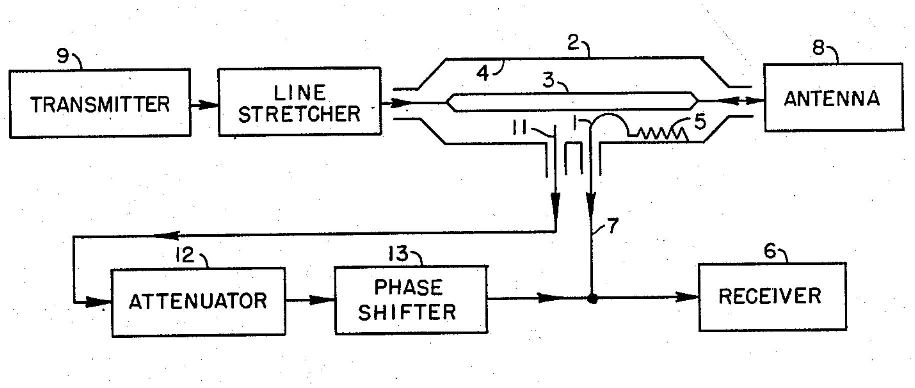
FIG. 1
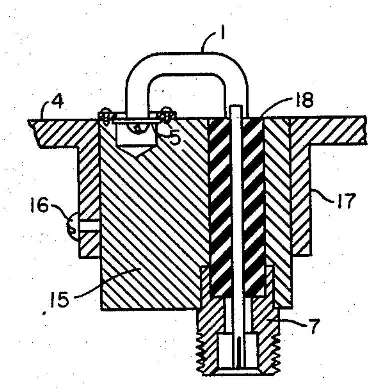
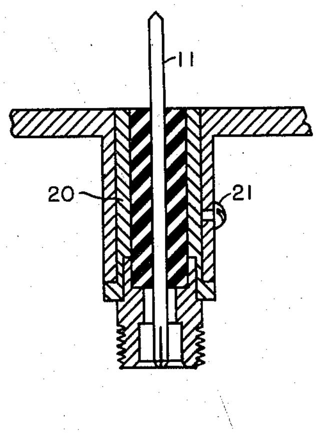
FIG. 2 FIG. 3
Inventor
JOHN D. JOHANNESEN
By M. A. Hayes
Attorney United States Patent Office 2,760,057

Patented Aug. 21, 1956

2,760,057

SIGNAL DUPLEXING SYSTEM

John D. Johannesen, United States Navy

Application January 10, 1946, Serial No. 640,294

4 Claims. (Cl. 250—13)

(Granted under Title 35, U. S. Code (1952), sec. 266)

This invention relates to transmission networks and more particularly to a transmission network operative to supply energy from an electromagnetic wave passing in one direction through the network but not in the other.

The invention employs a coupling loop inserted in an expanded portion of a coaxial line. The loop is so oriented that the voltage induced in it by magnetic coupling for a wave traveling in the forward direction is out of phase with that picked up by capacitive coupling. The voltage picked up by magnetic coupling from a wave traveling in the backward direction will be in phase with that picked by capacitive coupling. The loop will then supply a voltage from a wave traveling in a backward but not in a forward direction.

Such a device can be employed as a duplexer by using the coaxial line to couple an antenna to a transmitter and receiver in such a way that the energy from the transmitter travels down the line in the forward direction and that from the antenna in a backward direction. The coupling loop will supply energy to the receiver from the antenna but not from the transmitter.

Provision is made to compensate for reflection of transmitter energy from the antenna. A probe is inserted into the line which picks up some of the transmitted energy and feeds it through a phase shifter to the receiver to cancel out any energy from the transmitter traveling in a backward direction due to reflection at the antenna. This means for cancelling out the reflected energy is necessary only when mismatch of the antenna causes standing waves.

It is therefore an object of the invention to provide an improved transmission system with uni-directional pick up.

It is another object of the invention to provide a simplified duplexing device.

It is another object of the invention to provide a duplexing device in which compensation is made for reflection occurring at the antenna.

The invention will be further understood with reference to the exemplary embodiment shown in the drawing in which:

Fig. 1. is an embodiment of the invention, partly in block and partly in schematic diagram.

Fig. 2. is a cross section showing the means of attaching the coupling loop for supplying energy from the coaxial line.

Fig. 3 shows in cross section the means of inserting the probe in the line.

The duplexing function of the invention is illustrated in Fig. 1.

It is to be understood, however, that the transmission network is adapted to other uses in which uni-directional pick up is desired.

In Fig. 1 an electromagnetic wave from the transmitter travels down the coaxial line section in a forward direction. Energy from the antenna travels in a backward direction.

The coupling loop 1 is inserted into the wave guide 2 between the inner conductor 3 and the outer conductor 4. One end of the loop 1 is coupled through the resistor 5 to the outer conductor. The other end of the loop is coupled to the receiver 6 through line 7.

The resistor isolates the loop from ground and makes capacitive coupling possible.

The coupling loop is made rotatable so that it can be oriented in any desired position. It is constructed to have substantially the same capacitive coupling with the coaxial line in any position.

For proper functioning of the transmission network, the loop is turned until the voltage induced in it by magnetic coupling is out of phase with that induced by capacitive coupling, for a wave traveling in the forward direction.

By proper construction and orientation, the voltage induced in the loop by magnetic coupling due to a wave traveling in the forward direction can be made to substantially cancel that due to capacitive coupling.

For a wave traveling along the transmission line in the backward direction, the voltage induced in the loop by magnetic coupling will be in phase with that due to capacitive coupling, if the loop is oriented as above. Hence energy will be supplied to the receiver from the antenna 8, but not from the transmitter 9.

Difficulty may arise in the network due to reflection. For example, in its application in a duplexer, reflection of the transmitter wave from the antenna may supply voltage to the loop.

To overcome this effect, a pick up probe 11 is inserted in the line. The probe picks up some of the energy of the transmitted wave and feeds it through an attenuator 12 and a phase shifting network 13 to the line 7 leading from the coaxial line 2 to the receiver. By proper adjustment of the probe 11, the attenuator 12, and the phase shifter 13 the energy induced in the loop 1 by the reflected wave can be balanced out by the sample portion of the transmitted wave picked up by probe 11. It should be understood that the adjustment of probe 11 and the attenuator 12 perform a similar function in permitting a variation in the amplitude of the sample taken from the transmitted wave. This permits cancellation of the reflected wave even though the amount of mismatch may vary.

A cross section of the coupling loop assembly is shown in Fig. 2. The loop 1 is oriented by rotating circular plug 15, and secured by the set screw 16 in annulus 17 in the wall 4 of the line. The resistor 5 is connected between the end of the loop 1 and the outer conductor 4 of the coaxial line. 7 is the coaxial line leading from the expanded line to the receiver. 18 is a dielectric separating the inner and outer conductors.

Fig. 3 is a cross sectional view of the means of inserting the probe 11. The probe is raised and lowered by adjusting the coaxial line section 20. It is held in place by set screw 21.

The invention described herein may be manufactured and used by or for the Government of the United States of America for governmental purposes without the payment of any royalties thereon or therefor.

What is claimed is:

1. Duplexing means comprising a transmitter for generating signal energy, an antenna, a coaxial line having an inner and an outer conductor connecting said transmitter and said antenna for conducting transmitted signal energy from said transmitter to said antenna and received signal energy from said antenna to said transmitter, a coupling loop, means supporting said coupling loop between said line inner and outer conductors in magnetic and capacitive coupling relation with said signal energy in said coaxial line, means orienting said loop relative to said coaxial line for capacitively coupling energy from said transmitted signal energy in opposite phase relation with energy magnetically coupled from said transmitted signal energy, a receiver, a probe, means supporting said probe for insertion into said coaxial line, a phase shifter connected in series with said probe, and means connecting said coupling loop in parallel with said series-connected phase shifter and probe to said receiver.

2. In combination a transmitter, an antenna, a receiver, a coaxial line having an inner and an outer conductor connecting said transmitter and said antenna, a first and a second aperture in said outer conductor, a coupling loop, means for supporting said coupling loop through said first aperture and in capacitive and inductive coupling relation with said coaxial line, means for adjusting the relative capacitive and inductive coupling to substantially balance said couplings for energy travelling down the line in one direction, a probe, means supporting said probe through said second aperture within said coaxial line, a signal phase shifter connected in series with said probe, and means connecting said coupling loop in parallel with said series-connected phase shifter and probe to said receiver.

3. Duplexing means comprising a transmitter for generating signal energy, an antenna, a coaxial line having an inner and outer conductor connecting said transmitter and said antenna, a coupling loop, means supporting said coupling loop between said inner and outer conductors in magnetic and capacitive coupling relation with said coaxial line, means orienting said loop relative to said coaxial line for capacitively coupling energy from the transmitted signal energy in opposite phase relation with the energy magnetically coupled from the transmitted signal energy, a receiver, a probe, means supporting said probe within said coaxial line, a phase shifter connected in series with said probe, an attenuator connected in series with said probe and said phase shifter, and means connecting said coupling loop in parallel with said series connected phase shifter, attenuator and probe to said receiver.

4. In combination, a transmitter, an antenna, a receiver, a coaxial line having an inner and an outer conductor connecting said transmitter and said antenna, a first and a second aperture in said outer conductor, a coupling loop, means for supporting said coupling loop through said first aperture and in capacitive and inductive coupling relation with said coaxial line, means for adjusting the relative capacitive and inductive coupling to substantially balance said couplings for energy travelling down the line in one direction, a probe, means supporting said probe through said second aperture within said coaxial line, a signal phase shifter and an attenuator connected in series with said probe, and means connecting said coupling loop in parallel with said series connected phase shifter, attenuator and probe to said receiver.

References Cited in the file of this patent

UNITED STATES PATENTS

| | | |
|---|---|---|
| 2,202,699 | Leeds | May 28, 1940 |
| 2,423,416 | Sontheimer et al. | July 1, 1947 |
| 2,448,623 | Rose | Sept. 7, 1948 |